UNITED STATES PATENT OFFICE.

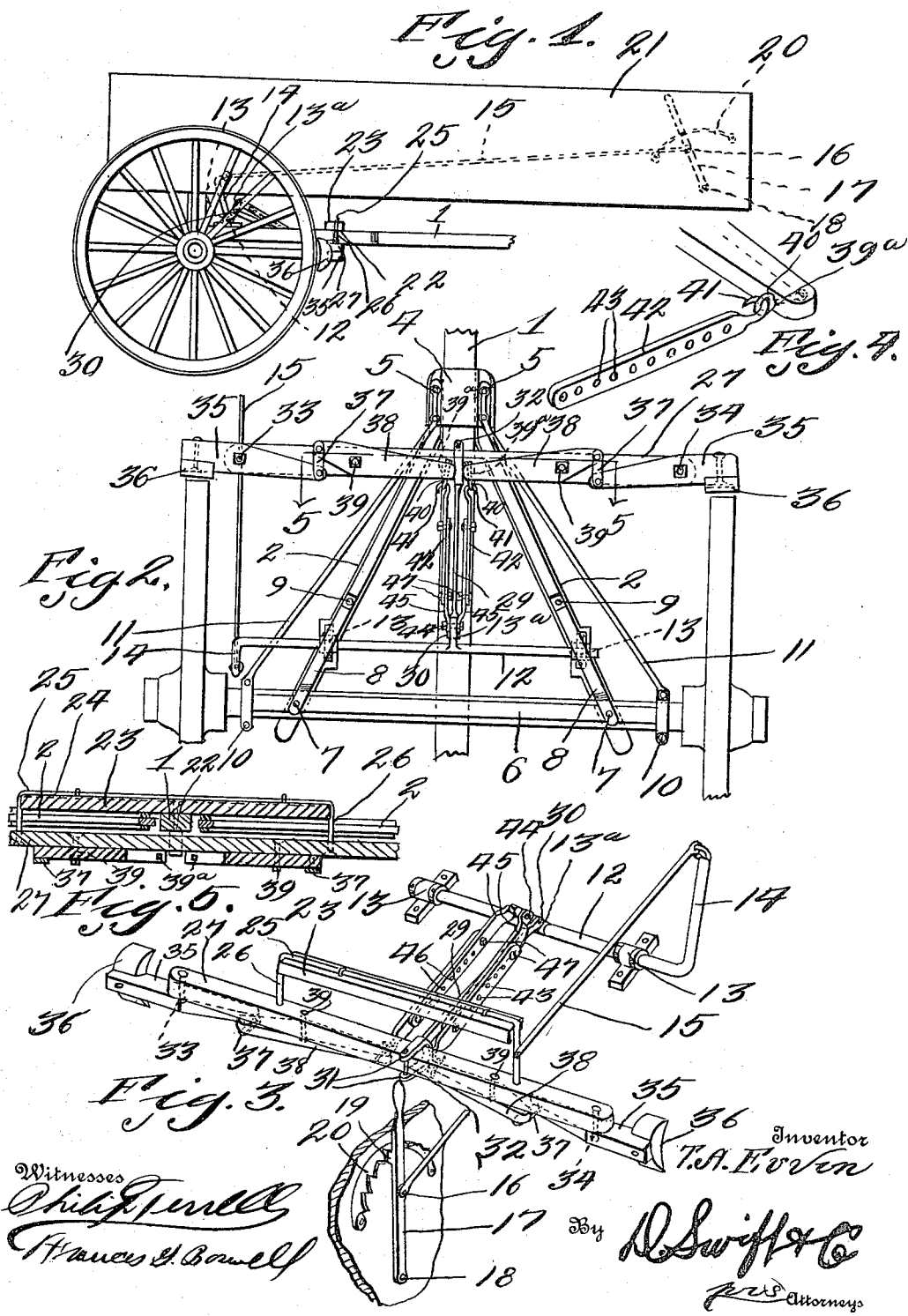

THEE A. ERVIN, OF PRINCETON, KENTUCKY.

WAGON-BRAKE.

1,181,585.  Specification of Letters Patent.  Patented May 2, 1916.

Application filed August 2, 1915. Serial No. 43,282.

*To all whom it may concern:*

Be it known that I, THEE A. ERVIN, a citizen of the United States, residing at Princeton, in the county of Caldwell and State of Kentucky, have invented a new and useful Wagon-Brake; and I do hereby declare the following to be a full, clear, and exact description of the invention, such as will enable others skilled in the art to which it appertains to make and use the same.

This invention relates to an improved brake for wagons, and an object of the invention is to provide a simple, efficient and practical construction of device of this nature, whereby the brake shoes may be easily and quickly operated, so as to effectually brake the wheels.

Another object of the invention is the provision of adjustable means connecting a rocking shaft (to which suitable means may be connected for operating it) and two adjacent levers, which in turn are linked to the brake shoe lever, whereby the brake shoes may be adjusted in their actions.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of a portion of a wagon showing a part of the rear running gear, with the brake mechanism as applied. Fig. 2 is a bottom plan view of the rear running gear with the brake mechanism applied. Fig. 3 is an enlarged detail perspective view of the brake mechanism detached. Fig. 4 is a detail perspective view, showing one of the adjustable links for connecting one of the brake shoe operating levers and the arm upon the rocking shaft. Fig. 5 is a sectional view on line 5—5 of Fig. 2.

Referring more particularly to the drawings, 1 designates the reach of the running gear, to which the rear hounds 2 are connected by means of the plate 4 and bolts 5. A metal strap or plate 6 is secured at 7 to the axle, and also secured at 7 are strips 8, which are connected to the hound as shown at 9. These strips 8 extend flat against the hounds from where they are connected at 9, for reinforcing the hounds. Also connected to the axle as shown at 10 are braces 11, which extend forwardly and toward each other and are secured by the bolts 5 to the forward parts of the hounds, thereby further reinforcing the structure.

A rock shaft 12 is mounted in suitable bearings 13 of the hounds 2, and is provided with a right angled extending arm 13ª. One end of the rock shaft has a right angled extending arm 14, to which a rod 15 is connected. The rod 15 is in turn connected at 16 to a suitable brake operating lever 17, which may be pivoted to one side of the wagon body, as shown at 18. The lever 17 is provided with a laterally extending lip 19 to engage any one of the teeth of the curved rack 20, which is secured to the side of the wagon body 21, for holding the lever 17 in adjusted position, for the purpose hereinafter set forth. Secured upon the upper faces of the hounds as shown at 22 is a bar or beam 23, in bearings 24 of which the arched portion 25 of an oscillatory bail 26 is mounted.

The side arms of the bail 26 are connected to the main brake beam 27, so that when the brake beam 27 is moved forwardly and backwardly the bail member will rock in its bearing, the bail constituting means whereby the main brake beam 27 will always move in a parallel plane. Connected to the arm 13ª is a link or bar 29, as shown at 30. This bar 29 is twisted, as shown, and its other end terminates in the arms 31, which straddle the main brake beam 27. A suitable bolt 32 passes through the free ends of the arms 31, so as to clamp the arms against the beam 27 securely, thereby connecting the beam and the arm 13ª. When the shaft 12 is rocked it is to be observed that the beam 27 is moved forwardly and backwardly. Pivoted to the under face of the beam as at 33 and 34 adjacent both ends are the auxiliary brake shoe beams 35 having brake shoes 36. The beams 35 are in turn linked by the links 37 to the beams 38, which are pivoted at 39 to the main beam 27. The adjacent end portions of the beams 38 have bolts 39ª provided with eyes 40, to which the hooked ends 41 of the link straps 42 are connected. The link straps 42 are provided with a series of apertures 43. Also connected to the free end of the arm 13ª by the bolt 44 are the adjacent ends of the link straps 45, which are provided with series of apertures 46. Bolts 47 extend through the registering apertures of each set of links or straps 42 and 45, so as to adjustably connect the same, whereby the brake shoes may be adjusted in their actions. As the brake shoes become worn, the links 42 and 45 may be adjusted relatively to each other, to compensate to the wear. Furthermore, if one brake shoe bears frictionally against its respective wheel greater than the opposite brake shoe, one set of links 42 and 45 may be adjusted accordingly, to compensate for this irregularity. When the rock shaft 12 is oscillated, by actuating the lever 17, the main brake beam 27 is moved rearwardly simultaneously with the actuation of the levers 35 and 38, but the backward movement of the brake beam 27 is not as great as the adjacent ends of the levers 38.

The invention having been set forth, what is claimed as new and useful is:—

In combination with the rear running gear of a wagon, a bar secured to the upper portions of the hounds of the running gear, a rocking bail mounted in bearings on the bar, a main brake beam connected to the downwardly extending arms of the bail, a series of auxiliary brake beams pivoted to the under face of the main beam and arranged in pairs upon both end portions of the main beam, the auxiliary beams of each pair having link connections, a rock shaft mounted in bearings on the rear running gear and provided with a lateral arm, the adjacent inner ends of the adjacent auxiliary levers of both pairs having adjustable link connections to the free end of said arm, said link connection consisting of two pairs of bars adjustably connected by apertures and bolt connections, a bar having one end connected to the main beam, and its other end connected to said arm at a point between the free end of the arm and where the arm forms a part of the rock shaft, and means for actuating the rock shaft.

In testimony whereof I have signed my name to this specification in the presence of two subscribing witnesses.

THEE A. ERVIN.

Witnesses:
J. B. McCHESNEY,
ROBERT ERVIN.

Copies of this patent may be obtained for five cents each, by addressing the "Commissioner of Patents, Washington, D. C."